US007568569B2

(12) United States Patent
Lamana et al.

(10) Patent No.: US 7,568,569 B2
(45) Date of Patent: Aug. 4, 2009

(54) FRICTION CLUTCH, PARTICULARLY FOR A MOTOR VEHICLE, COMPRISING DIFFERENTIATED FRICTION MEANS

(75) Inventors: Leonardo Lamana, Amiens (FR); Pierre Rouchon, Campinas (BR)

(73) Assignee: Valeo Embrayages, Amiens (FR)

( * ) Notice: Subject to any disclaimer, the term of this patent is extended or adjusted under 35 U.S.C. 154(b) by 564 days.

(21) Appl. No.: 10/584,405

(22) PCT Filed: Jan. 4, 2005

(86) PCT No.: PCT/FR2005/050006

§ 371 (c)(1), (2), (4) Date: Jun. 26, 2006

(87) PCT Pub. No.: WO2005/071279

PCT Pub. Date: Aug. 4, 2005

(65) Prior Publication Data
US 2009/0139824 A1 Jun. 4, 2009

(30) Foreign Application Priority Data
Jan. 9, 2004 (FR) .................................. 04 50061

(51) Int. Cl.
F16D 13/68 (2006.01)
F16D 3/14 (2006.01)
(52) U.S. Cl. ................... 192/214.1; 464/68.41
(58) Field of Classification Search ........... 192/210, 192/210.1, 213.11, 213.12, 213.21, 213.22, 192/213.3, 213.31, 214, 214.1; 464/68.4, 464/68.41

See application file for complete search history.

(56) References Cited

U.S. PATENT DOCUMENTS

| 4,398,625 | A | * | 8/1983 | Beccaris ................ 192/213.31 |
| 4,651,859 | A | | 3/1987 | Frantz et al. |
| 5,217,409 | A | * | 6/1993 | Dalbiez .................... 464/68.4 |
| 6,089,983 | A | | 7/2000 | Lebas et al. |

FOREIGN PATENT DOCUMENTS

| FR | 2 183 389 A | 12/1973 |
| GB | 2 210 677 A | 6/1989 |

* cited by examiner

Primary Examiner—Richard M. Lorence
(74) Attorney, Agent, or Firm—Berenato, White & Stavish, LLC

(57) ABSTRACT

A clutch comprises at least one damper (22) having rotating input (24) and output (26) elements, elastic elements having a circumferential effect carried by the first (28) and second (30) guide washers connected in rotationally fixed manner to one of the input (24) and output (26) elements and via a web (36) connected in a rotationally fixed manner to the other input (24) and output (26) element. The clutch also comprises friction assemblies (44), which are activated by angular displacements relative to the guide washers (28, 30) and to the web (36) and which have a friction element (46) capable of being coupled to the web (36) via the complementary circumferential stops that interact only when the web (36) angularly displaces in a predetermined direction with regard to the guide washers (28, 30). The complementary circumferential stops are provided on the friction element (46), and an element (50), that is distinct from the web (36) and from the friction element (46), is connected in a rotationally fixed manner to the web (36).

20 Claims, 9 Drawing Sheets

FRICTION CLUTCH, PARTICULARLY FOR A MOTOR VEHICLE, COMPRISING DIFFERENTIATED FRICTION MEANS

BACKGROUND OF THE INVENTION

1. Field of the Invention

The present invention relates to a friction clutch, particularly for a motor vehicle, comprising differentiated friction means.

2. Description of the Related Art

In a motor vehicle, a friction clutch has the task of transmitting a torque between a rotating input element and a rotating output element, by virtue of the friction between a pressure plate and a flywheel.

In general, the input element is formed by a friction disc and the output element is formed by a hub which is designed in particular to be coupled to a gearbox input shaft.

The friction clutch also has the task of ensuring the continuity of the torque transmitted and of filtering out the vibrations coming from the engine, in particular by virtue of damping means which comprise elastic elements and friction means.

When the flywheel is coupled to the gearbox input shaft via the friction clutch, the gearbox input shaft is generally subjected to a torque in a first direction, referred to as the counter-clockwise direction. In this counter-clockwise direction, the torque acts in the same direction as the direction of rotation of the engine.

If necessary, the driver may bring about engine braking by releasing the accelerator of the vehicle. In this case, the gearbox input shaft is subjected to a torque in a second direction, referred to as the clockwise direction. In this clockwise direction, the torque acts in the opposite direction to the direction of rotation of the engine.

The torque in the clockwise direction is generally not as high as the torque in the counter-clockwise direction. This is why, in order to prevent locking of the damping means of the clutch in the case of clockwise torque, these damping means usually comprise friction means which, depending on the counter-clockwise or clockwise direction of the torque, ensure different levels of friction (high or low respectively).

There has therefore been proposed, in the prior art, a friction clutch, particularly for a motor vehicle, of the type comprising at least one damper having:
  rotating input and output elements,
  elastic elements with a circumferential effect carried by first and second guide washers which are connected in a rotationally fixed manner to a first of the input and output elements and by a web connected in a rotationally fixed manner to a second of the input and output elements,
  friction means, which are activated by relative angular displacement of the guide washers and of the web and which comprise a friction element capable of being coupled to the web via complementary circumferential stops, referred to as coupling stops, which interact only when this web is displaced angularly in a predetermined direction with respect to the guide washers.

Usually, the elastic elements with a circumferential effect are housed in openings provided in the guide washers and the web. In a clutch which is designed in particular to equip a heavy weight, three openings may be provided in the web, said openings being spaced apart in the circumferential direction.

The friction element is coupled to the web in the case of counter-clockwise torque. Thus, different levels of friction are obtained as a function of the counter-clockwise or clockwise direction of the torque to which the gearbox input shaft is subjected, that is to say a friction designed to bring about a first hysteresis in the counter-clockwise direction and a friction designed to bring about a second hysteresis in the clockwise direction.

In general, the friction element comprises a friction washer, the coupling stops being formed by coupling tabs which extend the outer contour of this friction washer. In this case, the coupling tabs are designed to cooperate with complementary coupling stops delimited by notches provided in the contours of the openings of the web. These tabs, which are housed between the notches and the elastic elements, are also driven by these elastic elements.

These notches make it possible to house the free ends of the coupling tabs between the elastic elements and the zones of the contours of the openings which form bearing points for the elastic elements.

However, the coupling notches constitute deficits of material which make the web more fragile.

SUMMARY OF THE INVENTION

The object of the invention is in particular to propose means for coupling the friction element to the web when this web is displaced angularly in the predetermined direction with respect to the guide washers, and to do so without making the web more fragile.

To this end, the invention relates to a friction clutch, particularly for a motor vehicle, of the type mentioned above, characterized in that the complementary coupling stops are provided on the friction element and an element that is distinct from the web and from this friction element and is connected in a rotationally fixed manner to the web, said element being referred to as the attached element.

Thus, by providing the coupling stops on the attached element, which is distinct from the web, it is possible to avoid making this web more fragile by creating coupling notches in the contours of the openings of the web.

A friction clutch according to the invention may also include one or more of the following features:
  the coupling stops of the attached element are provided on axial protrusions which each have a free end designed to cooperate with the first guide washer, the attached element thus forming an axial spacer between the web and the first guide washer;
  the web comprises openings for housing and supporting the elastic elements with a circumferential effect, the attached element being coupled in rotation to the web by means of complementary axial fitting means provided on the attached element and at least one angular sector of the web which separates two openings of this web, referred to as the intermediate sector;
  the complementary axial fitting means comprise at least one axial pin which is provided on the attached element and is fitted in a complementary fitting orifice provided in the intermediate sector;
  the attached element is made of plastic or metal;
  the friction element comprises at least one driving stop able to cooperate with a complementary driving stop connected to the guide washers;
  the complementary driving stop connected to the guide washers is formed by a seat for the elastic element with a circumferential effect;
  the input element is formed by a friction disc which is coupled, for example, to a crankshaft of an engine, the friction element being free axially with respect to the web and being inserted axially between the first guide washer and the friction disc so as to cooperate with integral complementary friction surfaces of the first guide washer and the friction disc;

the integral complementary friction surfaces of the friction disc are provided on tabs with an axial elastic effect which extend the friction disc in the essentially radial direction towards its centre;

the tabs each have a free end which is extended circumferentially by two opposite branches bearing the friction surfaces;

the integral complementary friction surfaces of the friction disc are provided on an attached washer which is connected in rotation to the friction disc by means of tabs which cooperate with notches of this friction disc;

the clutch comprises an elastic element with an axial effect which works in compression between the web and the second friction washer;

the friction element comprises first and second friction washers which are designed to cooperate respectively with the first and second guide washers, a unidirectional drive washer, connected in rotation to the friction washers, on which the coupling stops are provided;

the unidirectional drive washer is on the one hand free axially with respect to the web and on the other hand is inserted axially between the friction washers;

the first friction washer is free axially with respect to the unidirectional drive washer, a first elastic element with an axial effect working in compression between this first friction washer and this unidirectional drive washer;

the web is inserted axially between the unidirectional drive washer and the second friction washer, the second friction washer being connected axially to the unidirectional drive washer, a second elastic element with an axial effect working in compression between the web and the second friction washer;

the driving stop is provided on the unidirectional drive washer;

the output element is formed by a hub which can be coupled to a gearbox shaft;

the elastic elements with a circumferential effect are distributed in three openings provided in each of the elements consisting of the guide washers and the web;

the attached element helps to centre the friction element.

BRIEF DESCRIPTION OF THE DRAWINGS

The invention will be better understood upon reading the following description, which is given solely by way of example and with reference to the appended drawings, in which.

DETAILED DESCRIPTION OF THE PREFERRED EMBODIMENTS

Figure 1:
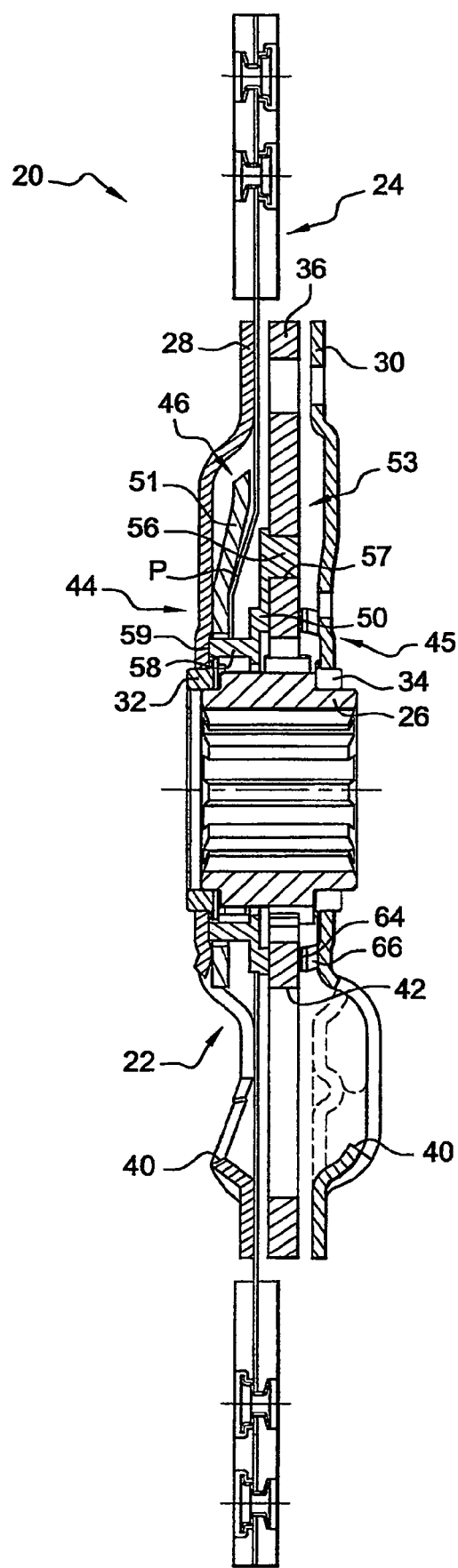
FIG. 1 is a view in axial section of a friction clutch according to a first embodiment of the invention.

FIG. 1 shows a friction clutch according to a first embodiment of the invention.

In the example described, the clutch is designed to equip a motor vehicle and to couple a driven shaft, such as an input shaft of a gearbox, to a drive shaft, such as the crankshaft of an internal combustion engine.

The friction clutch, denoted by the general reference 20, is equipped with damping means which comprise in particular a damper 22. This damper 22 is mounted between a rotating input element, such as a friction disc 24, and a rotating output element, such as a cylindrical hub 26, which is coupled to the driven shaft by means of internal longitudinal splines provided in this hub. The input and output elements are essentially coaxial.

In a known manner, the friction disc 24 is designed to be held between a flywheel, which is connected in a rotationally fixed manner to the drive shaft, and a pressure plate which is actuated by clutch means.

The damper comprises first 28 and second 30 guide washers which are connected to one another and are mounted in rotation on the hub 26 by means of annular bearings 32, 34 respectively. The friction disc 24 is fixed to the first guide washer 28, for example by means of rivets.

Figure 3:
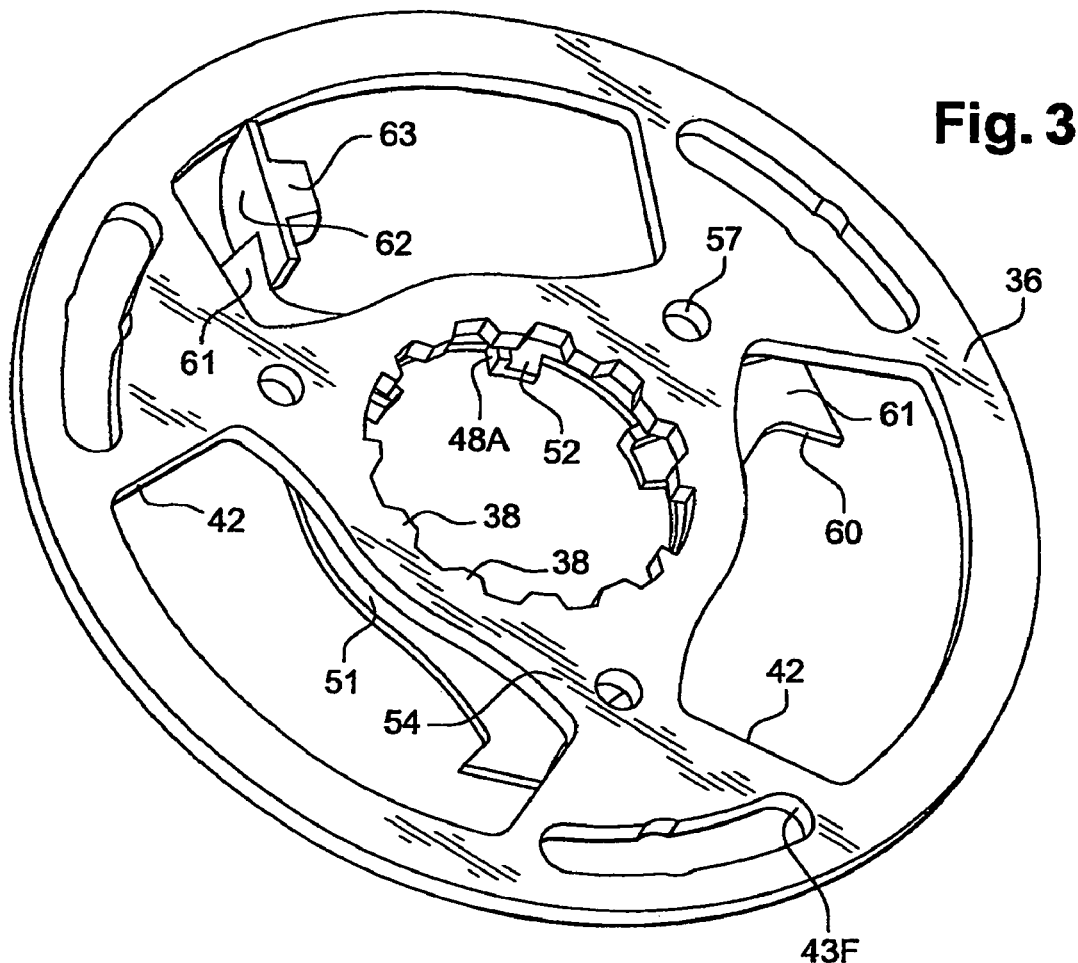
FIG. 3 is a perspective view of the web and of the friction element of the friction clutch shown in FIG. 1.

An annular web 36, which is shown in greater detail in FIG. 3, is arranged between the two guide washers 28, 30, coaxially thereto, and comprises on the inner periphery a set of teeth 38 which meshes with a corresponding set of teeth on the outer periphery of the hub 26.

The damper 22 comprises damping means which are designed to filter out the vibrations between the engine and the gearbox.

These damping means comprise elastic elements with a circumferential action (not shown), such as coil springs with a high level of stiffness, which are housed in openings 40, 42 provided respectively in the guide washers 28, 30 and the annular web 36. These elastic elements help to transmit a rotational torque between the guide washers 28, 30 and the web 36.

In the example described, the elastic elements with a circumferential action are distributed in three openings 40, 42 provided in each of the elements consisting of the guide washers 28, 30 and the web 36. The damper 22 thus permits a greater angular displacement between the guide washers 28, 30 and the web 36 than is permitted by a damper comprising elastic elements distributed in four openings.

Figure 5:
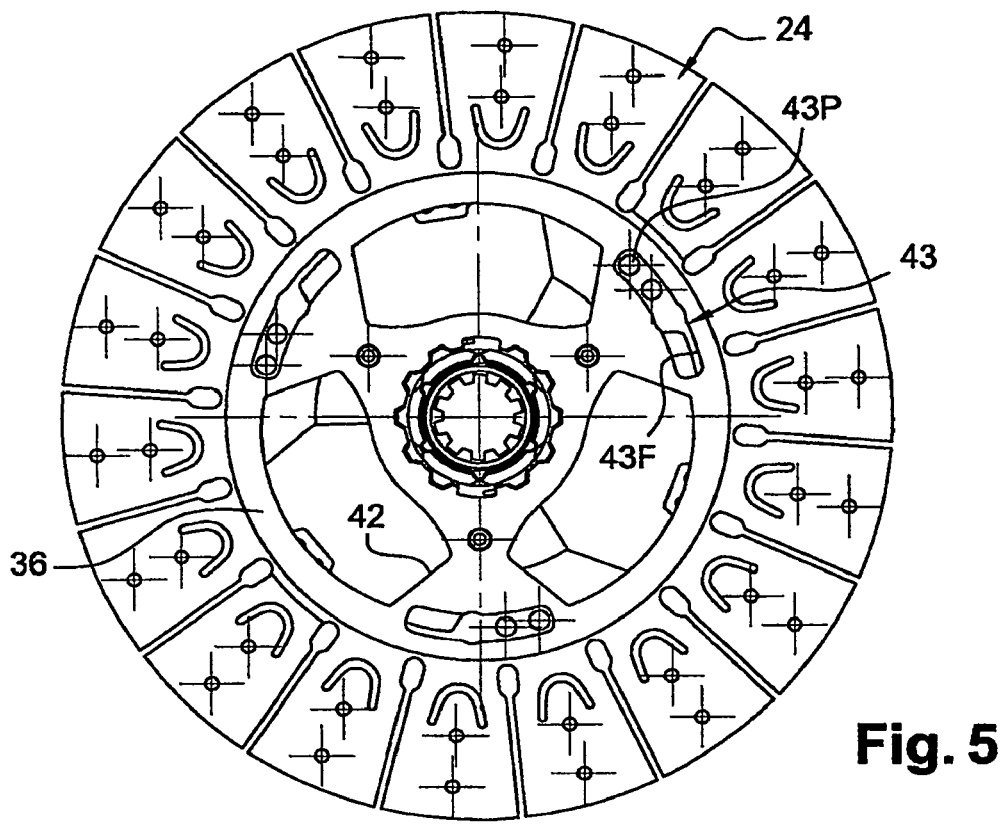
FIGS. 5 and 6 are respectively front and rear views of elements of the friction clutch shown in FIG. 1, in particular of the friction disc, in a first relative position of the web with respect to the guide washers.
Figure 7:
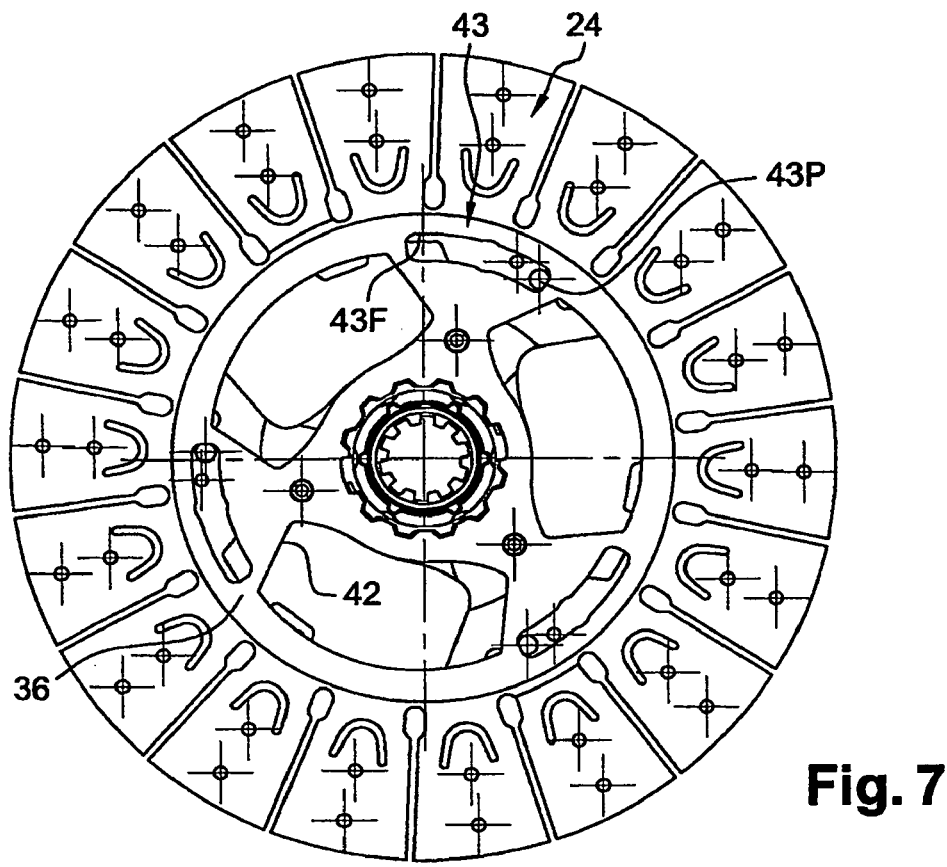
FIGS. 7 and 8 are views similar to those of FIGS. 5 and 6, in a second relative position of the web with respect to the guide washers.

It will be noted that, in order for the elastic elements not to be compressed beyond a predetermined threshold, which would adversely affect their service life, blocking means 43 are provided, which can be seen in particular in FIGS. 5 and 7 and which have the task of limiting the angular displacement between the web 36 and the guide washers 28, 30. These blocking means comprise cylindrical spacers 43P which extend axially between the two guide washers 28 and 30 and connect these two guide washers 28 and 30 in rotation. The cylindrical spacers 43P are able to be displaced in openings 43F of the web, the ends of which serve as a stop for these spacers 43P.

The damping means furthermore comprise first 44 and second 45 friction means which are capable of being activated by relative angular displacement of the guide washers 28, 30 and of the web 36.

The first friction means 44 comprise in particular a friction element 46 capable of being coupled to the web 36 via complementary circumferential stops, referred to as coupling stops 48A, 48B, which interact only when this web 36 is displaced angularly in a predetermined direction with respect to the guide washers 28, 30. Thus, the first friction means 44 are activated only when the web 36 is displaced angularly with respect to the guide washers 28, 30 in the predetermined direction. This predetermined direction corresponds to the case where the gearbox input shaft is subjected to a torque in the counter-clockwise direction.

Figure 4:
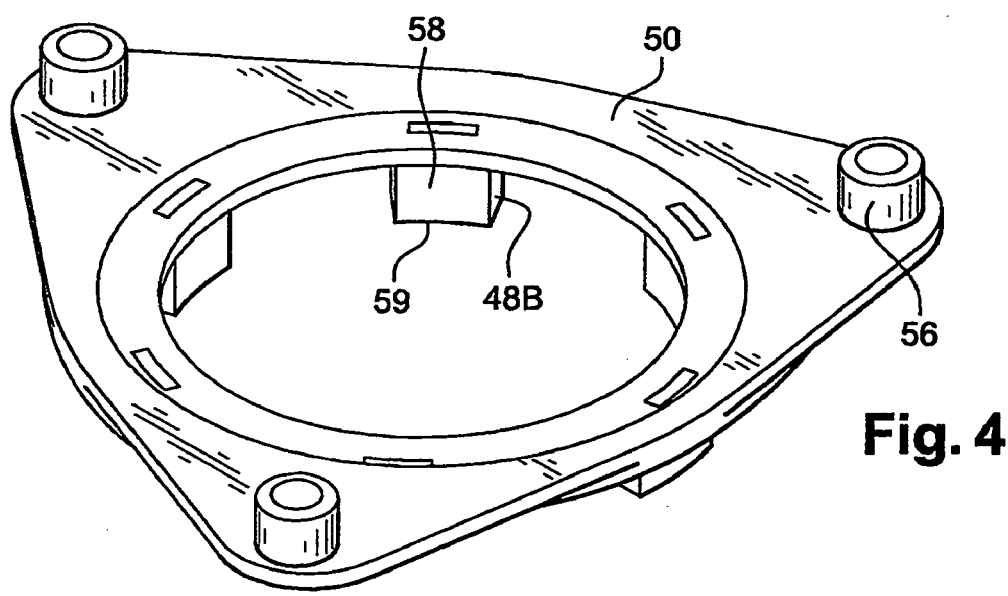
FIG. 4 is a perspective view of the attached element of the friction clutch shown in FIG. 1.

These complementary coupling stops 48A, 48B are provided on the friction element 46 and an element 50 that is distinct from the web 36 and from this friction element 46 and is connected in a rotationally fixed manner to the web 36. This element 50, which is shown in greater detail in FIG. 4, is referred to as the attached element.

The friction element 46 comprises a unidirectional drive washer 51 which is free axially with respect to the web 36 and is inserted axially between the first guide washer 28 and the friction disc 24 so as to cooperate with integral complementary friction surfaces of the first guide washer 28 and the friction disc 24.

It will be noted that the attached element 50 helps to centre the unidirectional drive washer 51.

Figure 2:
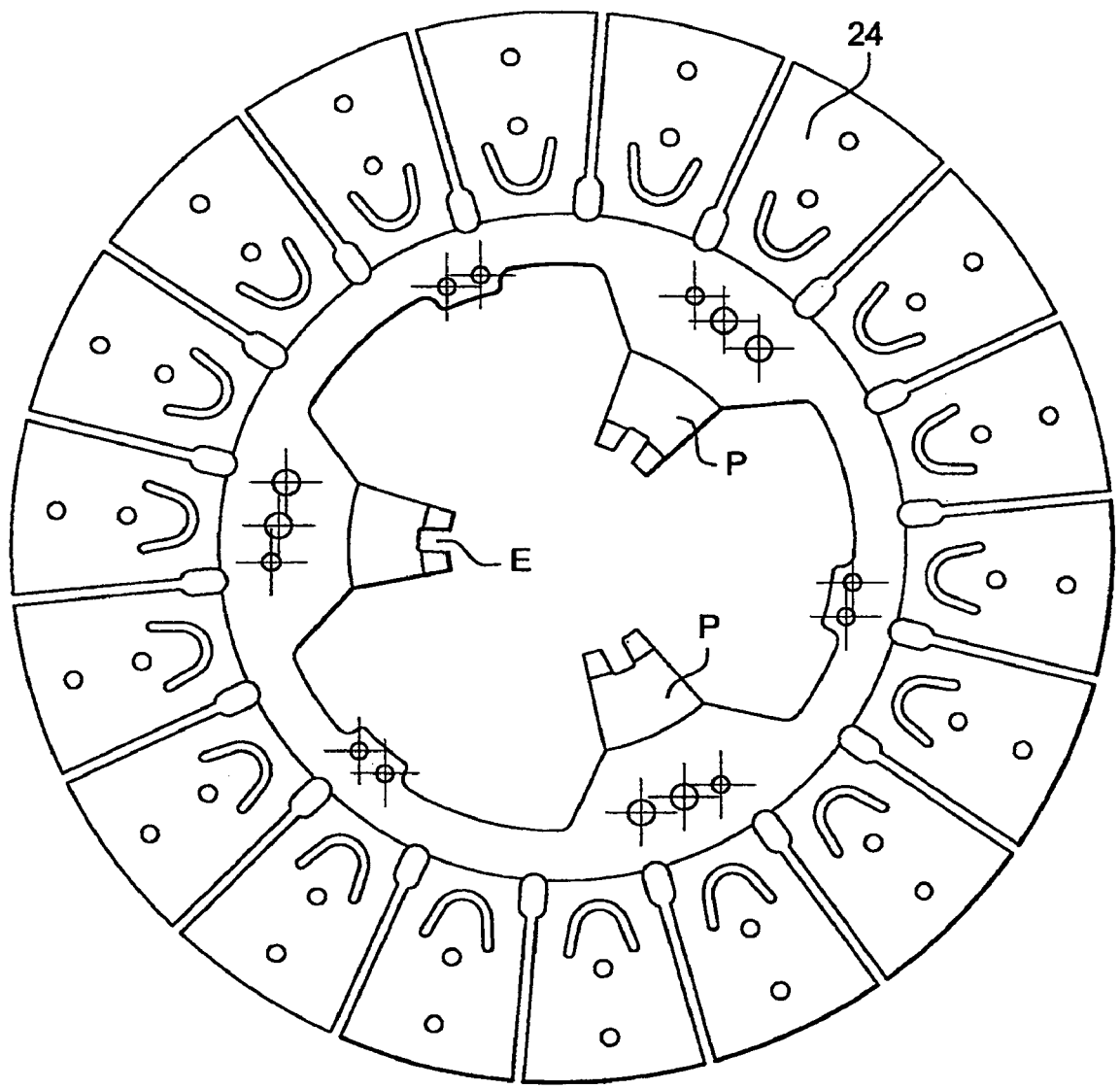
FIG. 2 is a front view of the friction disc of the friction clutch shown in FIG. 1.

In the first embodiment of the invention, the integral complementary friction surfaces of the friction disc 24 are provided on tabs P with an axial elastic effect which extend the friction disc 24 in the essentially radial direction towards its centre (see FIG. 2). These tabs P, due to their axial elastic effect, also have the task of holding the unidirectional drive washer 51 against the first guide washer 28.

Figure 13:
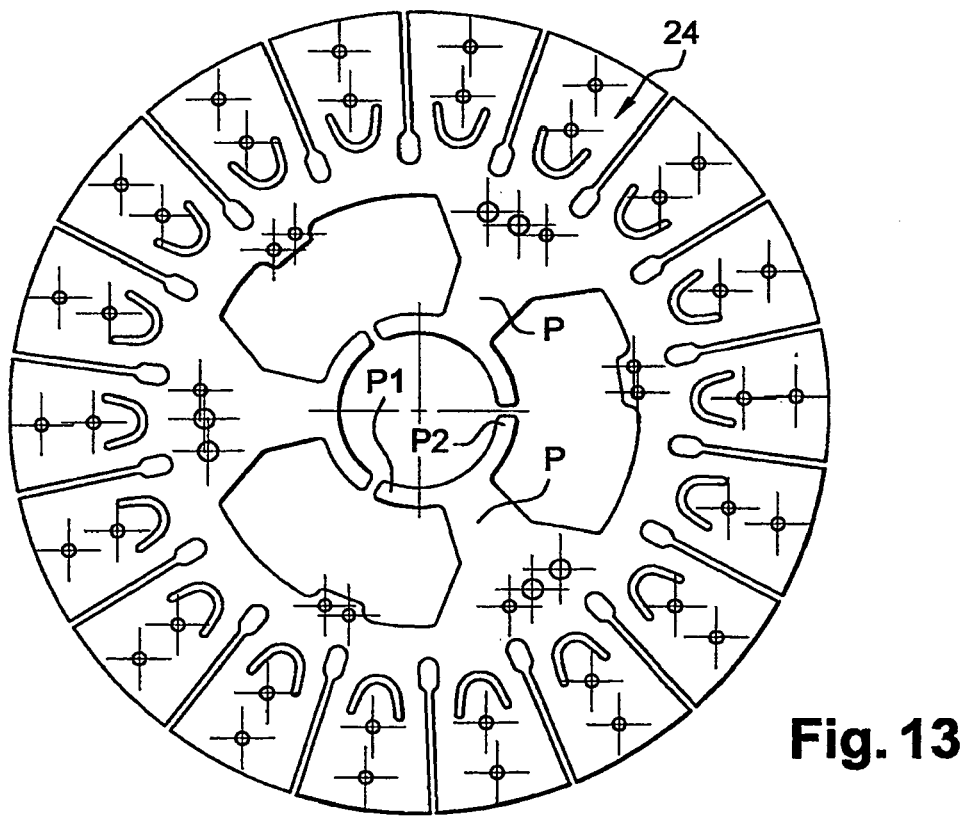
FIG. 13 is a view similar to FIG. 2 of a friction disc according to a first variant of the first embodiment of the invention.

According to a first variant which is shown in FIG. 13, the tabs P each have a free end which is extended circumferentially by two opposite branches P1 and P2 bearing the friction surfaces. These branches P1 and P2 optimize the friction.

Figure 14:
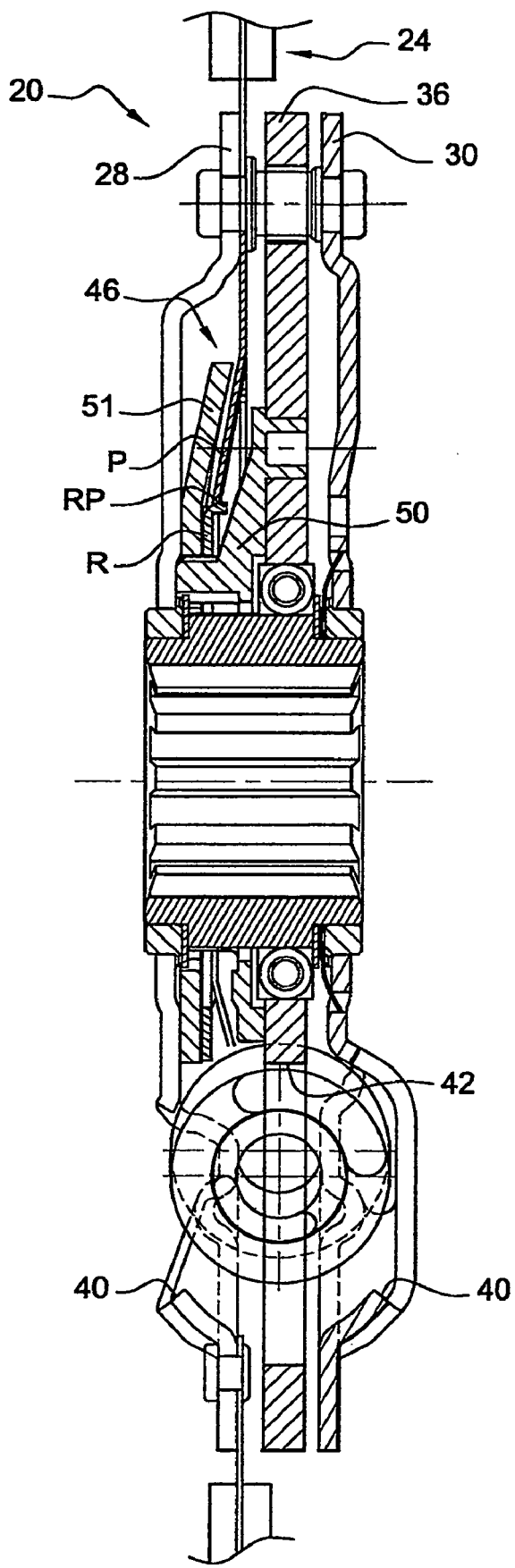
FIG. 14 is a view similar to FIG. 1 of a clutch comprising a friction disc according to a second variant of the first embodiment of the invention.

According to a second variant which is shown in FIG. 14, the integral complementary friction surfaces of the friction disc 24 are provided on an attached washer R. This washer R is connected in rotation to the friction disc 24 by means of tabs RP which cooperate with notches E, visible in FIG. 2, provided on the tabs P of the friction disc 24.

The coupling stops 48A of the friction element 46 are formed by teeth 52 provided on an inner contour of the unidirectional drive washer 51. In the first embodiment, the coupling stops 48A are delimited by an angled edge of the teeth 52.

The attached element 50 is coupled in rotation to the web 36 by means of complementary axial fitting means 53 provided on this attached element 50 and on three angular sectors 54 of the web 36, referred to as intermediate sectors 54. Each intermediate sector 54 angularly separates two successive openings 42 of this web 36. The complementary axial fitting means 53 comprise three axial pins 56 which are provided on the attached element 50 and are fitted in complementary fitting orifices 57 provided in the intermediate sectors 54, that is to say in sectors of the web which comprise enough material so as not to make this web more fragile.

The coupling stops 48B of the attached element 50 are provided on axial protrusions 58 which each have a free end 59 designed to cooperate with the first guide washer 28. The attached element 50 thus forms an axial spacer between the web 36 and the first guide washer 28. The attached element 50 is preferably made of plastic, but if necessary may be made of metal.

It will be noted that the load on the first friction means 44 depends only on the structure of the friction disc 24 in this first embodiment of the invention.

In order to activate the first friction means 44 as soon as a torque is applied to the gearbox input shaft in the counter-clockwise direction (in particular when this counter-clockwise torque follows a torque in the clockwise direction), the friction clutch 20 comprises return means for returning the friction element 46 to a position in which the complementary coupling stops 48A, 48B cooperate with one another.

These return means comprise driving stops 60 which are provided on peripheral tabs 61 of the unidirectional drive washer 51 and are able to cooperate with complementary driving stops 62 connected in rotation to the guide washers 28, 30 in the case of clockwise torque. Preferably, as shown in FIG. 3, each complementary driving stop 62 is formed by a seat 63 for the elastic element with a circumferential effect. It will be noted that, in the case of clockwise torque, each seat 63 bears against the washers 28, 30 so as to be connected to the movement of these washers 28, 30 and to return the coupling stops 48A of the unidirectional drive washer 51 so that they make contact with the coupling stops 48B of the attached element 50, as soon as the clockwise torque ceases.

The second friction means 45 are permanently active independently of the direction of angular displacement of the web 36 with respect to the guide washers 28, 30.

The second friction means 45 comprise integral complementary friction surfaces of the free ends 59 of the axial protrusions 58 of the attached element 50 and the first guide washer 28.

The second friction means 45 furthermore comprise integral complementary friction surfaces of the web 36 and of a friction washer 64 which is connected in a rotationally fixed manner to the second guide washer 30. This friction washer 64 is biased elastically against the web 36 by means of an elastic element 66 with an axial effect.

Certain aspects of the mode of operation of the friction clutch 20 according to this first embodiment of the invention will be described below.

Figure 6:
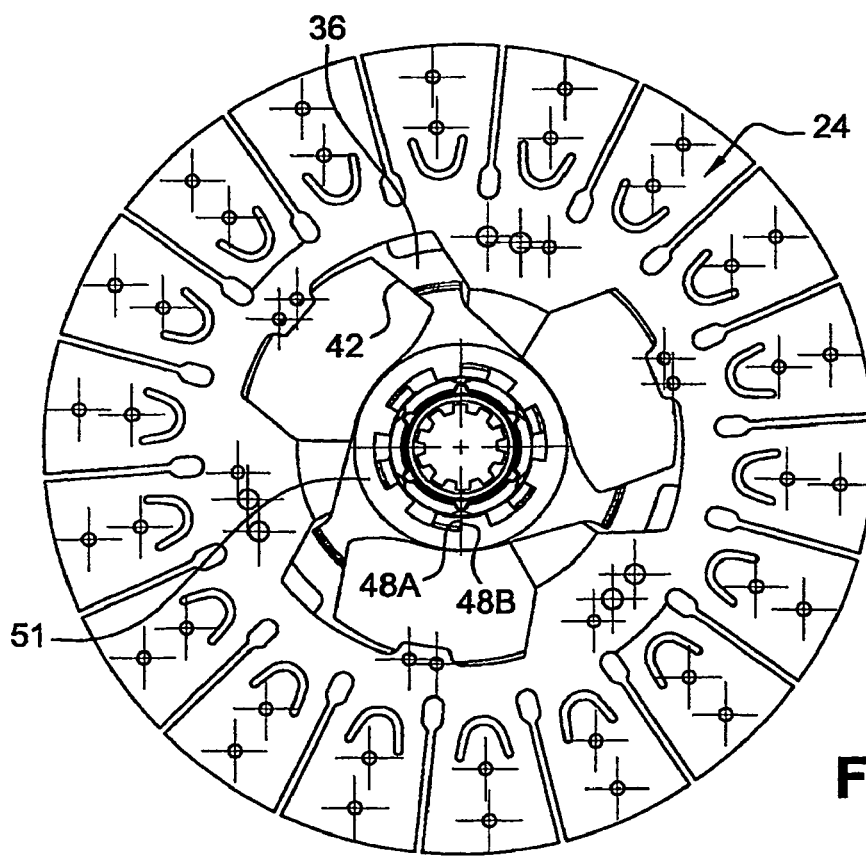

When the gearbox input shaft is subjected to a torque in the counter-clockwise direction (FIGS. 5 and 6), the first 44 and second 45 friction means are active so as to provide relatively high levels of friction in order to effectively filter out the vibrations of the engine.

This is because, in this case, the coupling stops 48B of the attached element 50 cooperate with the coupling stops 48A provided on the unidirectional drive washer 51 so as to activate the first friction means 44: the unidirectional drive washer 51 is coupled to the web 36 via the attached member 50 and cooperates with the integral complementary friction surfaces of the friction disc 24 and the first guide washer 28.

Figure 8:
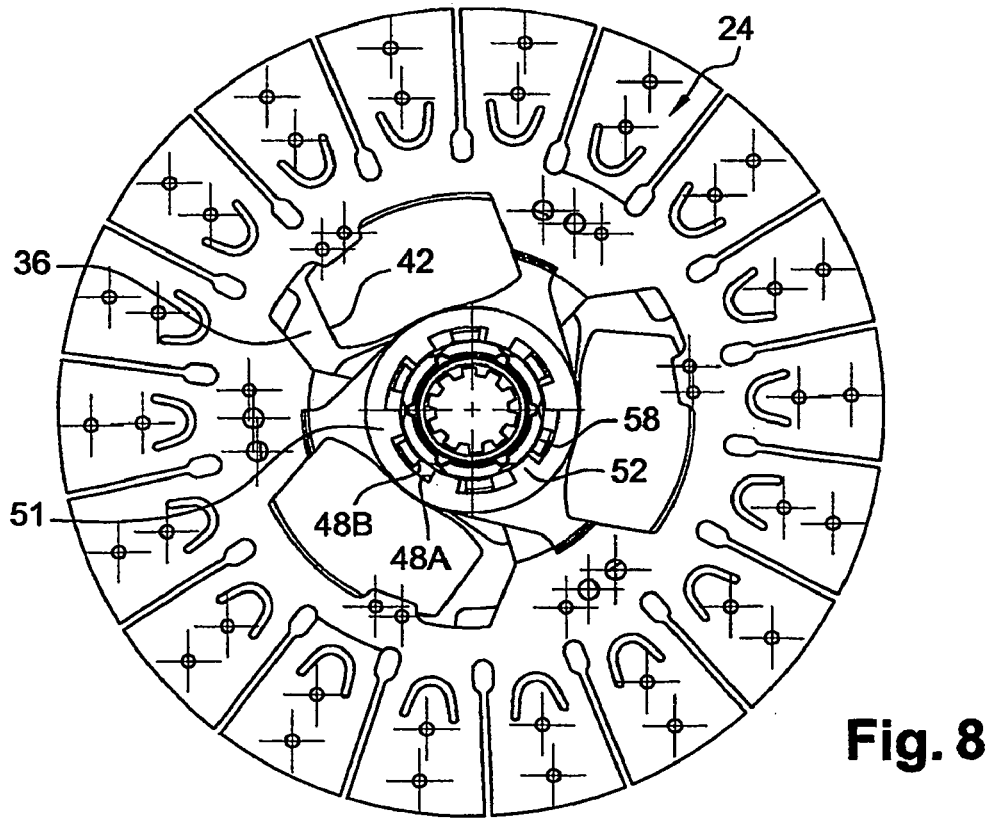

When the gearbox input shaft is subjected to a torque in the clockwise direction (FIGS. 7 and 8), only the second friction means 45 are active so as to provide lower levels of friction than in the counter-clockwise direction.

This is because, in this case, the web 36 undergoes a relative angular displacement with respect to the unidirectional drive washer 51 so that the coupling stops 48A and 48B no longer cooperate with one another. The blocking means 43 prevent any contact between the teeth 52 and the protrusions 58. The web 36 and the friction element 46 are decoupled and the first friction means 44 are deactivated.

Figure 9:
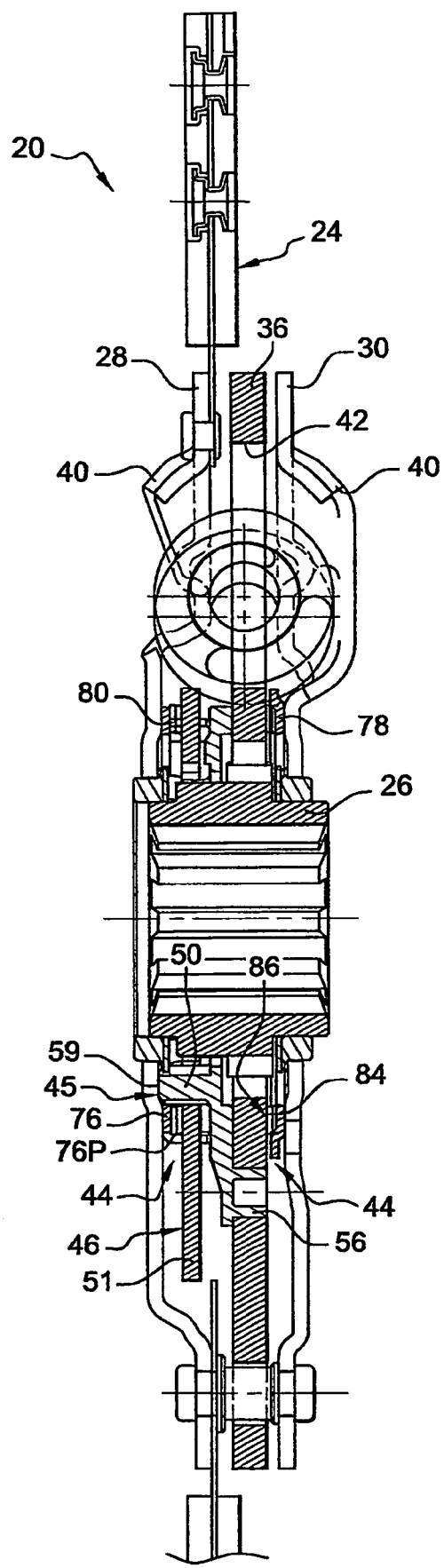
FIG. 9 is a view in axial section of a friction clutch according to a second embodiment of the invention.

FIG. 9 shows a friction device 20 according to a second embodiment of the invention. In this FIG. 9, elements which are analogous to those of the preceding figures are denoted by identical references.

In this second embodiment, the friction element 46 of the first friction means 44 comprises first 76 and second 78 friction washers which are designed to cooperate respectively with the first 28 and second 30 guide washers. Furthermore, the unidirectional drive washer 51 of the first friction means 44 is free axially with respect to the web 36 and is inserted axially between the friction washers 76 and 78.

Figure 12:
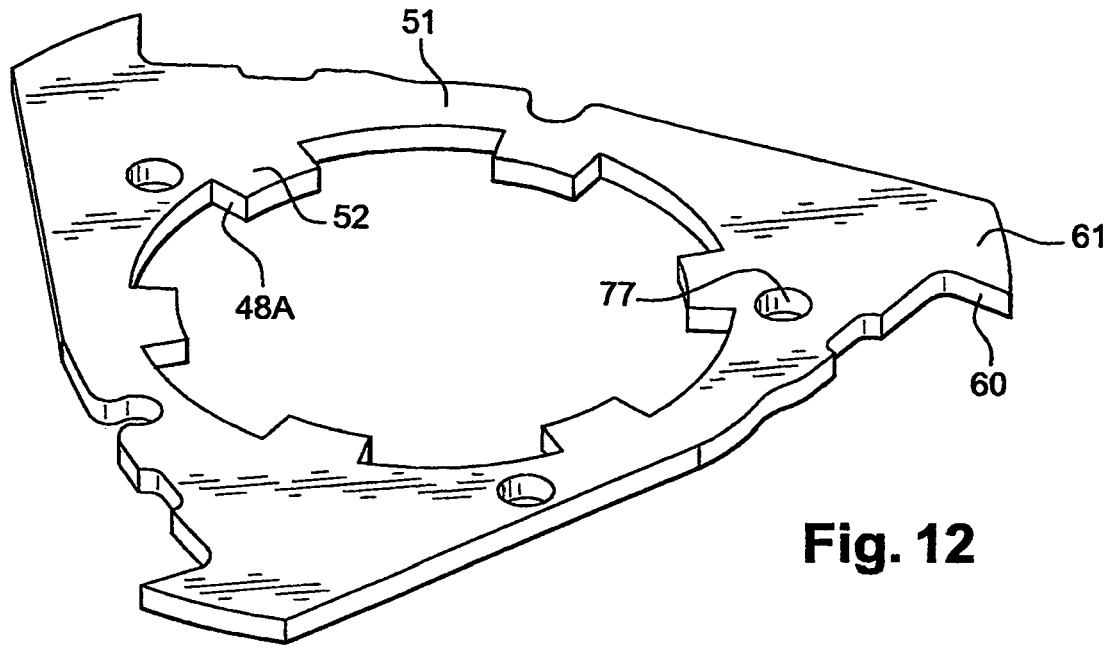
FIG. 12 is a perspective view of the unidirectional drive washer of the friction clutch shown in FIG. 9.

With reference to FIG. 12, it will be noted that, in the second embodiment, the coupling stops 48A are delimited by the edge of the teeth 52.

The first friction washer 76 is free axially with respect to the unidirectional drive washer 51. This friction washer 76 comprises tabs 76P for connecting it in rotation to the unidirectional drive washer 51, said tabs cooperating with complementary orifices 77 provided in the unidirectional drive washer 51 (these orifices 77 can be seen in FIG. 12).

A first elastic element 80 with an axial effect works in compression between the first friction washer 76 and the unidirectional drive washer 51 so as to bias this friction washer 76 against the first guide washer 28. This first guide washer 28 and the first friction washer 76 thus form first complementary friction surfaces of the first friction means 44.

Figure 11:
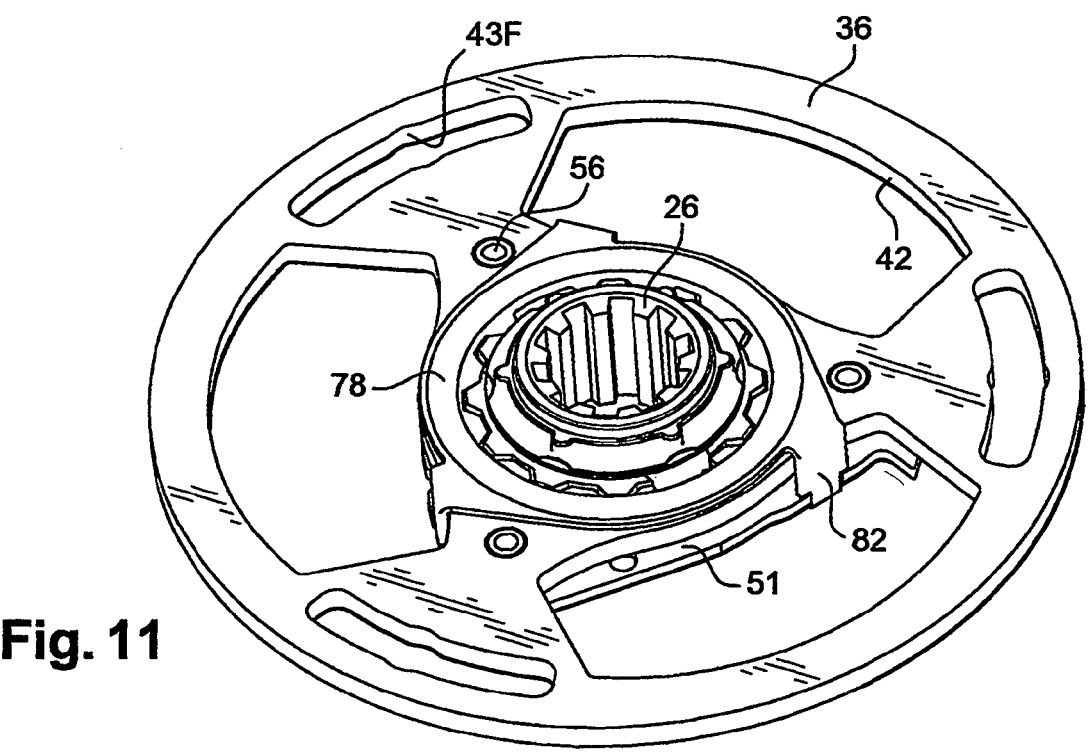
FIG. 11 is a perspective view, from a different point of view, of the elements of FIG. 10 and of other elements of the friction clutch shown in FIG. 9.

The web 36 is inserted axially between the unidirectional drive washer 51 and the second friction washer 78 (see in particular FIG. 11).

Figure 10:
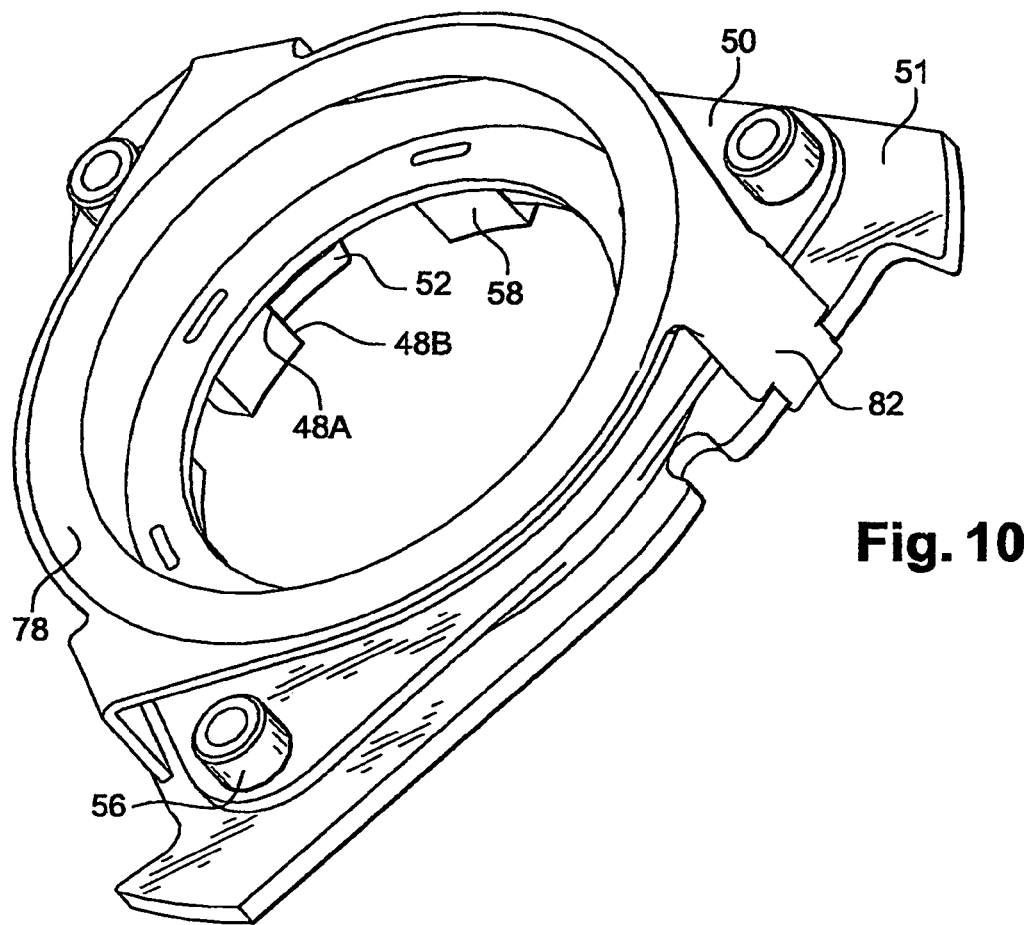
FIG. 10 is a perspective view of the attached element, the unidirectional drive washer and the friction washer of the friction clutch shown in FIG. 9.

The second friction washer 78 is connected axially to the unidirectional drive washer 51 and is connected in rotation to this unidirectional drive washer 51 by virtue of means 82 which can be seen in FIGS. 10 and 11. These means 82 comprise for example peripheral tabs provided on the friction washer 78.

A second elastic element 84 works in compression between the web 36 and the second friction washer 78, so as to bias the second friction washer 78 against the second guide washer 30. This second guide washer 30 and the second friction washer 78 thus form second complementary friction surfaces of the first friction means 44.

In the second embodiment of the invention, the second friction means 45 (which are permanently active independently of the direction of angular displacement of the web 36 with respect to the guide washers 28, 30) comprise only integral complementary friction surfaces of the free ends 59 of the axial protrusions 58 of the attached element 50 and the first guide washer 28.

In the second embodiment of the invention, the damping means also comprise third friction means 86 which, unlike the first friction means 44, are activated only when the web 36 is displaced angularly with respect to the guide washers 28, 30 in a direction opposite the predetermined direction. This predetermined direction corresponds to the case where the gearbox input shaft is subjected to a torque in the clockwise direction.

These third friction means 86 comprise complementary friction surfaces which are formed by the contacting surfaces of the web 36 and the second elastic element 84.

Certain aspects of the mode of operation of the friction clutch 20 according to the second embodiment of the invention will be described below.

As in the first embodiment of the invention, when the gearbox input shaft is subjected to a torque in the counter-clockwise direction, the first 44 and second 45 friction means are active so as to provide relatively high levels of friction in order to effectively filter out the vibrations of the engine.

When the gearbox input shaft is subjected to a torque in the clockwise direction, the first friction means are deactivated due to the fact that the relative displacement between the guide washers 28, 30 and the friction element 46 has ceased. On the other hand, the second 45 and third 86 friction means are active so as to provide lower levels of friction than in the counter-clockwise direction.

It will be noted therefore that the levels of friction in the counter-clockwise direction and in the clockwise direction can be set independently of one another by selecting in particular first 80 and second 84 elastic elements of suitable stiffness.

The invention is not limited to the embodiments described above.

In particular, the damper 22 may comprise elastic elements distributed in more than three openings provided in each of the elements consisting of the guide washers 28, 30 and the web 36.

Furthermore, the friction clutch 20 may comprise the damper 22, which forms a main damper, and also a conventional pre-damper. It will be noted in this case that the structure of the first friction means 44 is independent of that of the pre-damper, both with regard to the load biasing the first friction means 44 and the balancing of the forces in the set of elements constituting these first friction means 44.

The invention claimed is:

1. Friction clutch, comprising at least one damper (22) having:
   rotating input (24) and output (26) elements,
   elastic elements with a circumferential effect carried by first (28) and second (30) guide washers which are connected in a rotationally fixed manner to a first of the input (24) and output (26) elements and by a web (36) connected in a rotationally fixed manner to a second of the input (24) and output (26) elements,
   friction assemblies (44), which are activated by relative angular displacement of the guide washers (28, 30) and of the web (36) and which comprise a friction element (46) capable of being coupled to the web (36) via complementary circumferential stops, referred to as coupling stops (48A, 48B), which interact only when this web (36) is displaced angularly in a predetermined direction with respect to the guide washers (28, 30),
   wherein the complementary coupling stops (48A, 48B) are provided on the friction element (46) and an attached element (50) that is distinct from the web (36) and from this friction element (46) and is connected in a rotationally fixed manner to the web (36).

2. Clutch according to claim 1, characterized in that the coupling stops (48B) of the attached element (50) are provided on axial protrusions (58) which each have a free end (59) designed to cooperate with the first guide washer (28), the attached element (50) thus forming an axial spacer between the web (36) and the first guide washer (28).

3. Clutch according to claim 1, characterized in that the web (36) comprises openings (42) for housing and supporting the elastic elements with a circumferential effect, the attached element (50) being coupled in rotation to the web (36) by means of complementary axial fitting means (53) provided on the attached element (50) and at least one angular sector (54) of the web (36) which separates two openings (42) of this web (36), referred to as the intermediate sector (54).

4. Clutch according to claim 3, characterized in that the complementary axial fitting means (53) comprise at least one axial pin (56) which is provided on the attached element (50) and is fitted in a complementary fitting orifice (57) provided in the intermediate sector (54).

5. Clutch according to claim 1, characterized in that the attached element (50) is made of plastic or metal.

6. Clutch according to claim 1, characterized in that the friction element (46) comprises at least one driving stop (60) able to cooperate with a complementary driving stop (62) connected to the guide washers (28, 30).

7. Clutch according to claim 6, characterized in that the complementary driving stop (62) connected to the guide washers (28, 30) is formed by a seat (63) for the elastic element with a circumferential effect.

8. Clutch according to claim 1, characterized in that the input element (24) is formed by a friction disc (24) which is adapted to be coupled to a crankshaft of an engine, the friction element (46) being free axially with respect to the web (36) and being inserted axially between the first guide washer (28) and the friction disc (24) so as to cooperate with integral complementary friction surfaces of the first guide washer (28) and the friction disc (24).

9. Clutch according to claim 8, characterized in that the integral complementary friction surfaces of the friction disc (24) are provided on tabs (P) with an axial elastic effect which extend the friction disc (24) in the essentially radial direction towards its centre.

10. Clutch according to claim 9, characterized in that the tabs (P) each have a free end which is extended circumferentially by two opposite branches (P1, P2) bearing the friction surfaces.

11. Clutch according to claim 8, characterized in that the integral complementary friction surfaces of the friction disc (24) are provided on an attached washer (R) which is connected in rotation to the friction disc (24) by means of tabs (RP) which cooperate with notches (E) of this friction disc.

12. Clutch according to claim 8, characterized in that it comprises an elastic element (66) with an axial effect which works in compression between the web (36) and the second friction washer (30).

13. Clutch according to claim 1, characterized in that the friction element (46) comprises first (76) and second (78) friction washers which are designed to cooperate respectively with the first (28) and second (30) guide washers, a unidirectional drive washer (51), connected in rotation to the friction washers (76, 78), on which the coupling stops (48A) are provided.

14. Clutch according to claim 13, characterized in that the unidirectional drive washer (51) is on the one hand free axially with respect to the web (36) and on the other hand is inserted axially between the friction washers (76, 78).

15. Clutch according to claim 14, characterized in that the first friction washer (76) is free axially with respect to the unidirectional drive washer (51), a first elastic element (80) with an axial effect working in compression between this first friction washer (76) and this unidirectional drive washer (51).

16. Clutch according to claim 15, characterized in that the web (36) is inserted axially between the unidirectional drive washer (51) and the second friction washer (78), the second friction washer (78) being connected axially to the unidirectional drive washer (51), a second elastic element (82) with an axial effect working in compression between the web (36) and the second friction washer (78).

17. Clutch according to claim 13, wherein the friction element (46) comprises at least one driving stop (60) able to cooperate with a complementary driving stop (62) connected to the guide washers (28, 30), and wherein the driving stop (60) is provided on the unidirectional drive washer (51).

18. Clutch according to claim 1, characterized in that the output element (26) is formed by a hub (26) which can be coupled to a gearbox shaft.

19. Clutch according to claim 1, characterized in that the elastic elements with a circumferential effect are distributed in three openings (40, 42) provided in each of the elements consisting of the guide washers (28, 30) and the web (36).

20. Clutch according to claim 1, characterized in that the attached element (50) helps to centre the friction element (46).

* * * * *